United States Patent
Allen

(10) Patent No.: US 9,594,184 B2
(45) Date of Patent: Mar. 14, 2017

(54) SCINTILLATION DETECTORS AND METHODS FOR ENHANCED LIGHT GATHERING

(71) Applicant: Robbie L. Allen, The Woodlands, TX (US)

(72) Inventor: Robbie L. Allen, The Woodlands, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 14/613,895

(22) Filed: Feb. 4, 2015

(65) Prior Publication Data

US 2016/0223707 A1 Aug. 4, 2016

(51) Int. Cl.
*G01V 5/06* (2006.01)
*G01V 5/04* (2006.01)
*G01T 1/20* (2006.01)

(52) U.S. Cl.
CPC .............. *G01V 5/06* (2013.01); *G01T 1/2018* (2013.01); *G01V 5/045* (2013.01)

(58) Field of Classification Search
CPC ........... G01T 1/20; G01T 1/24; G01T 1/2018; G01V 8/00; G01V 5/06
See application file for complete search history.

(56) References Cited

U.S. PATENT DOCUMENTS

| | | | |
|---|---|---|---|
| 2,902,604 A | 9/1959 | Baldwin | |
| 5,517,030 A | 5/1996 | Nabais Conde | |
| 5,821,541 A * | 10/1998 | Tumer | G01T 1/006 250/363.03 |
| 6,151,769 A | 11/2000 | Bliss | |
| 6,627,897 B1 | 9/2003 | Francke | |
| 7,291,841 B2 * | 11/2007 | Nelson | G01T 1/243 250/370.01 |
| 8,389,946 B2 | 3/2013 | Friedman | |
| 8,692,182 B2 | 4/2014 | Nikitin | |
| 2002/0117625 A1 | 8/2002 | Pandelisev | |
| 2007/0034793 A1 * | 2/2007 | Estes | E21B 47/024 250/269.1 |
| 2012/0235047 A1 * | 9/2012 | Lewellen | A61B 6/037 250/366 |
| 2012/0241630 A1 | 9/2012 | Walker | |
| 2012/0267519 A1 * | 10/2012 | Nikitin | E21B 47/0002 250/256 |
| 2012/0312994 A1 | 12/2012 | Nikitin | |
| 2013/0020488 A1 | 1/2013 | Flamanc | |
| 2013/0112856 A1 | 5/2013 | Ferenc | |
| 2014/0246600 A1 | 9/2014 | Kotter | |

* cited by examiner

*Primary Examiner* — David Porta
*Assistant Examiner* — Faye Boosalis
(74) *Attorney, Agent, or Firm* — Cantor Colburn LLP

(57) ABSTRACT

An embodiment of an apparatus for measuring properties of an earth formation includes: a carrier configured to be disposed in a borehole in an earth formation; a scintillation material configured to emit light flashes in response to exposure to radiation, the scintillation material having a surface configured to be directed toward a region of the formation; an array of solid-state photodetectors that extends along at least one surface of the scintillation material, wherein the scintillation material has a shape configured to concentrate the light flashes and direct the light flashes toward the array; and a processor configured to detect signals generated by photo detectors in the array and estimate energy levels and positions of the light flashes within the scintillation material.

20 Claims, 4 Drawing Sheets

SCINTILLATION DETECTORS AND METHODS FOR ENHANCED LIGHT GATHERING

BACKGROUND

Radiation measurement tools are useful in a variety of applications, such as energy industry operations. Examples of energy industry operations include processes for evaluating subterranean formations such as natural gamma ray, induced gamma ray and density logging devices. For example, pulsed neutron porosity measurements involve bombarding a formation with high energy neutrons and monitoring the attenuation of the neutron flux by the formation at different distances from the neutron source. Pulsed neutron spectroscopy is based on the measurement of the spectrum of induced gamma rays emitted by the formation when it is irradiated by high energy neutrons.

Such tools utilize scintillation detectors to detect neutrons and gamma rays. A scintillation detector includes a scintillation material and a photodetector. An ionization particle (e.g., a neutron or a gamma ray emitted in response to neutron irradiation of a formation) interacts with the scintillation material and part of the energy released in the interaction reaction is converted into photons which travel inside of the scintillator until they reach the optical window of the photodetector. The photodetector converts the photons into an output electrical signal.

The accuracy of the measurement of the energy created in the interaction of ionization radiation with the scintillation material of the detector depends on how much light emitted from the scintillation event reaches the optical window of the photodetector. Challenges in taking accurate measurements may stem from impurities in a scintillation material or other components of a scintillation detector. For example, gamma ray scintillation detectors can have dimming issues due to partial opacity within the scintillator material dimming light flashes.

SUMMARY

An embodiment of an apparatus for measuring properties of an earth formation includes: a carrier configured to be disposed in a borehole in an earth formation; a scintillation material configured to emit light flashes in response to exposure to radiation, the scintillation material having a surface configured to be directed toward a region of the formation; an array of solid-state photodetectors that extends along at least one surface of the scintillation material, wherein the scintillation material has a shape configured to concentrate the light flashes and direct the light flashes toward the array; and a processor configured to detect signals generated by photo detectors in the array and estimate energy levels and positions of the light flashes within the scintillation material.

An embodiment of a method of processing a scintillation detection signal includes: deploying a carrier in a borehole in an earth formation, the carrier including a scintillation material configured to emit light flashes in response to exposure to radiation; directing a surface of the scintillation material toward a region of the formation; detecting the light flashes by an array of solid-state photodetectors that extends along at least one surface of the scintillation material, wherein the scintillation material has a shape configured to concentrate the light flashes and direct the light flashes toward the array; and detecting, by a processor, signals generated by photodetectors in the array and estimating energy levels and positions of the light flashes within the scintillation material.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Apparatuses and methods for detecting ionizing radiation such as neutrons and gamma rays and/or characterizing subterranean formations are described herein. The apparatuses and methods include improved scintillation detectors (e.g., neutron, and neutron and gamma ray detectors) for use in applications such as borehole and earth formation measurements (e.g., wireline well logs, logging while drilling, and memory logging). Embodiments described herein provide for improved detection of radiation directions and magnitudes for more accurate logging spectrums.

Embodiments of scintillation detectors include various features that facilitate and improve gathering of light emitted in response to radiation, and can be used to correct opacities to enable more precise spectrum analyses for radiation and particles. Such features include solid-state diode arrays, accumulation lenses, and/or shaped scintillation materials.

Figure 1:
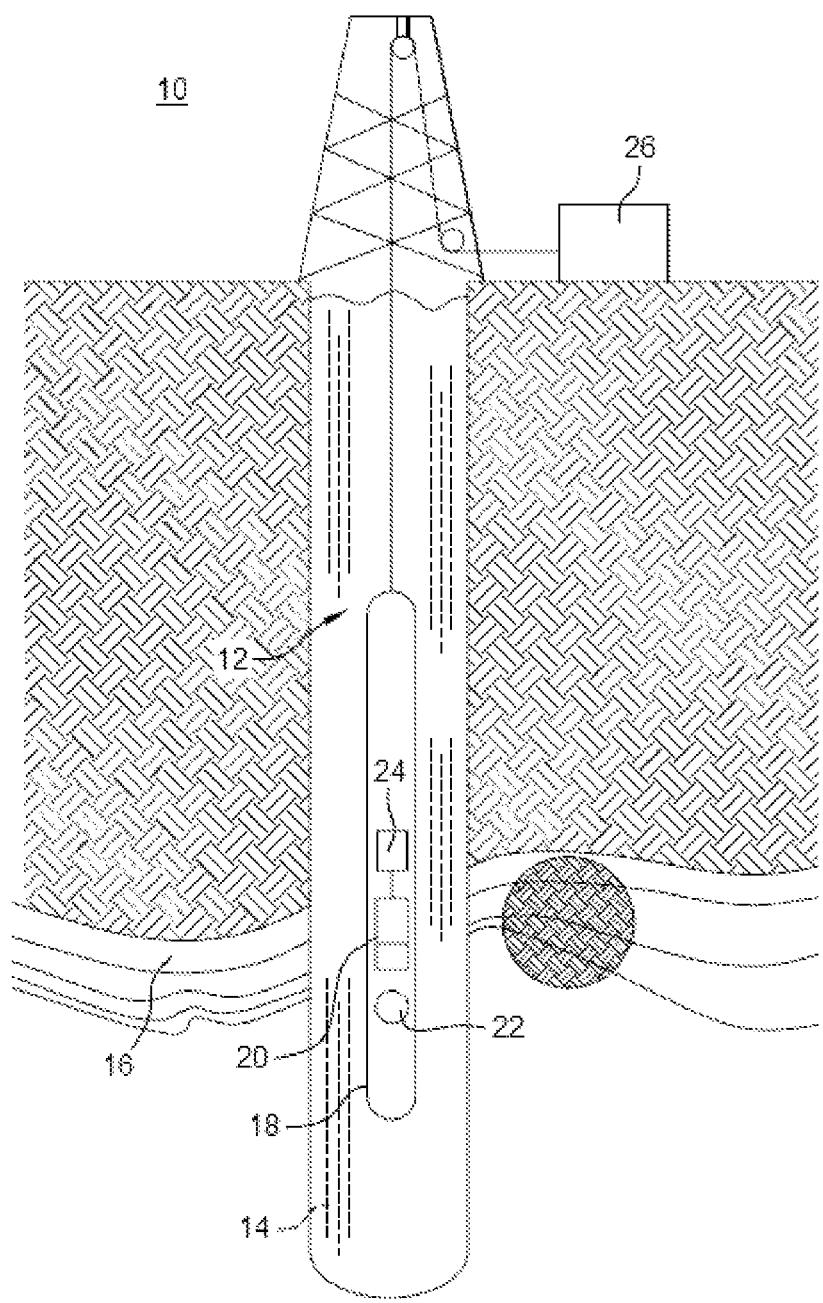
FIG. 1 depicts an embodiment of a subterranean well drilling, evaluation, exploration, and/or production system.

FIG. 1 illustrates an embodiment of a subterranean well drilling, evaluation, exploration, and/or production system 10 that includes a borehole string 12 that is shown disposed in a borehole 14 that penetrates at least one earth formation 16 during a subterranean operation. In one embodiment, the borehole string includes a downhole tool 18 such as a well logging tool. In this example, the downhole tool 18 is a wireline tool, but is not limited thereto, and may be disposed with any suitable carrier. For example, the downhole tool 18 can be incorporated in a drill string or bottom-hole assembly as a logging while drilling (LWD) tool. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings.

As described herein, "formations" refer to the various features and materials that may be encountered in a subsurface environment and surround the borehole. Formations may be below land areas or subsea, and include various constituents including hydrocarbons, rock material, minerals, clays and/or sand. Formations may include, for example, conventional gas reservoirs, conventional oil reservoirs, heavy oil, shale gas, shale oil and tight gas. In addition, the systems and methods may be used in conjunction with various applications, such as conventional gas, conventional oil, subsea or deep water, geothermal, heavy oil, oil sands, shale gas, shale oil and/or tight gas applications.

Still referring to FIG. 1, the downhole tool 10 includes a radiation detector 20 for performing radiation measurements related to characterizing the formation 16. The radiation detector 20 is configured to detect electromagnetic and/or particle radiation. The term "detect" as used herein is inclusive of measuring the detected radiation. Non-limiting embodiments of detecting radiation include a number of counts, a count-rate, and energy of the detected radiation. Although not shown, the downhole tool 18 can include other components for characterizing the formation 4 such as a formation fluid tester or a pulsed-neutron source.

Various sensing or measurement devices may be included in the system 10, in downhole and/or surface locations. For example, one or more parameter sensors (or sensor assemblies such as LWD subs) are configured for formation evaluation measurements relating to the formation, borehole, geophysical characteristics and/or borehole fluids. These sensors may include formation evaluation sensors (e.g., resistivity, dielectric constant, water saturation, porosity, density and permeability), sensors for measuring geophysical parameters (e.g., acoustic velocity and acoustic travel time), and sensors for measuring borehole fluid parameters (e.g., viscosity, density, clarity, rheology, pH level, and gas, oil and water contents).

The downhole tool 18, in one embodiment, is configured as a pulsed neutron tool. The tool 18 includes, for example, at least one pulsed neutron source 22 and at least one radiation detector 20. In one embodiment, electronics 24 are also included for storing, transmitting and/or processing signals and/or data generated by the radiation detector 20. An associated method includes disposing the downhole tool into a borehole and emitting neutrons into the formation. Resulting gamma ray signals are received by the radiation detector(s) and processed to generate pulse spectra that are used to estimate various properties of the formation.

In one embodiment, the tool 18 is equipped with transmission equipment to communicate ultimately to a surface processing unit 26. Such transmission equipment may take any desired form, and different transmission media and methods may be used. Examples of connections include wired, fiber optic, wireless connections and memory based systems. The surface processing unit 26 is disposed in operable communication with the downhole tool 18 and/or electronics 24, and may also be connected to other downhole components (e.g., other types of sensors or subs, a BHA, downhole pumps, downhole motors, a drilling assembly, etc.) and/or surface components (e.g., surface sensors, drill rig, lowering and tripping tools, pumps, etc.). The surface processing unit is configured to receive, store and/or transmit data generated from the radiation detector 20, and includes processing components configured to analyze data and/or control operational parameters. The surface processing unit 26 includes any number of suitable components, such as processors, memory, communication devices and power sources.

The radiation detector 20 includes at least one scintillation detector configured to receive radiation from the formation 16, convert radiation to light and detect the light to estimate characteristics of the radiation. The detector 20 includes a scintillating material that emits electromagnetic radiation in response to absorbing ionizing radiation such as gamma rays. Interaction between particles of ionization radiation (e.g., neutrons or gamma rays) and the scintillation material produces a number of visible light photons (referred to as a light flash) which are emitted uniformly and isotropically, and are detected using suitable photo detectors. Any suitable scintillating materials may be used, such as lithium-6 materials including lithium glasses or other scintillation materials containing the $^6$Li isotope, sodium iodide material (e.g., NaI(Tl) crystals, or sodium iodide activated with thallium) or their combination.

Figure 2:
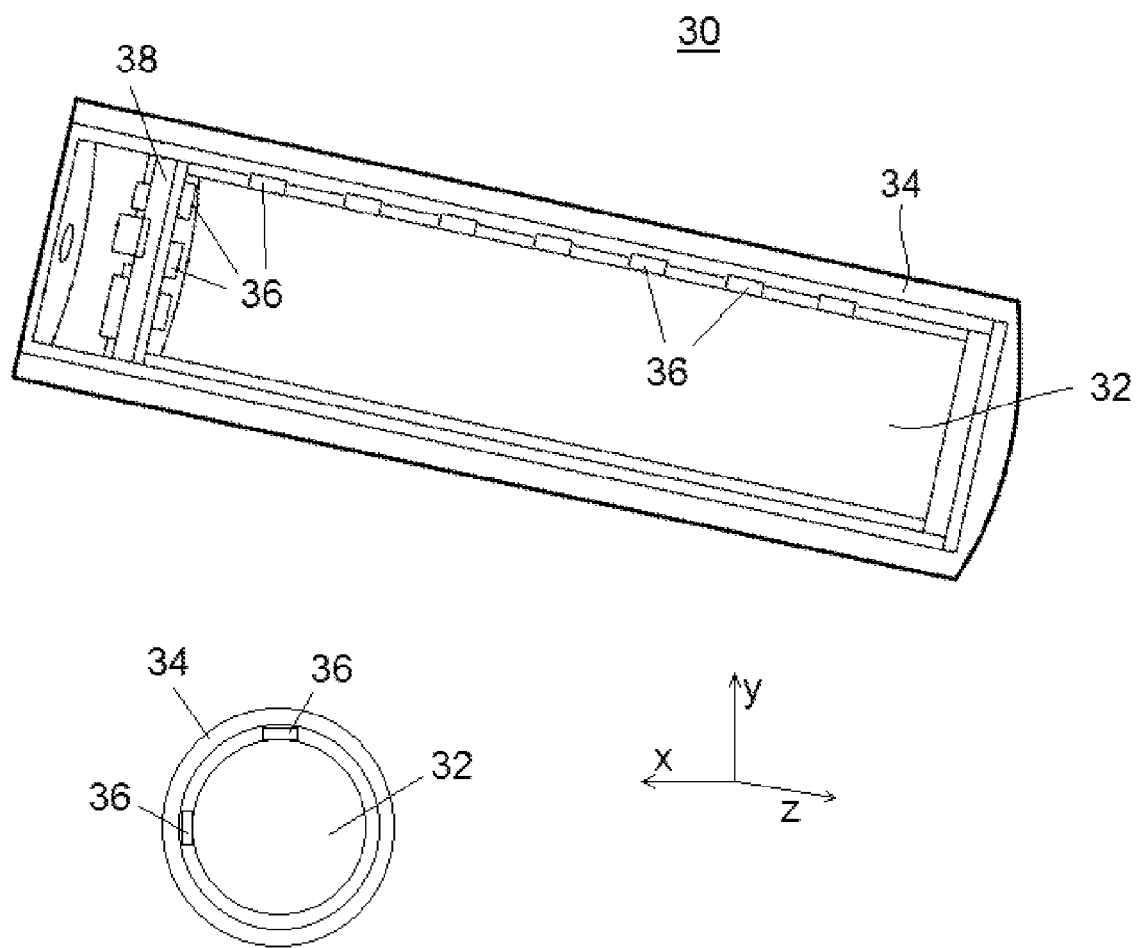
FIG. 2 depicts an embodiment of a scintillation detector.

An embodiment of a scintillation detector 30 is shown in FIG. 2. The detector 30 includes a scintillating material 32 (e.g., a scintillation crystal) disposed in a housing 34. The scintillating material may be any suitable type of material such as a crystal, doped glass, or radiation detector made from another material. One or more photodetectors 36 are disposed at various locations and are configured to detect flashes generated in the scintillating material 32. Emitted photons travel through the scintillating material (and optionally through additional transparent material) until they reach one or more photodetectors 36. Each photodetector 36 converts visible photons into an electronic signal, amplifies the signal, and creates a current pulse. The current pulse amplitude is proportional to the number of the visible light photons collected. The photodetectors 36 are connected to electronics 38 (e.g., a printed circuit board or other electronics package) via conductive leads, for signal detection, transmission and/or analysis.

The electronics may include any suitable component, such as a microprocessor, controller or other circuitry, that can receive electrical signals generated by the detectors 36. Other components that may be included in the detector 30 include heat detection devices, such as thermistors, thermocouples, or other temperature sensing devices. Such devices allow for calibration or heat correction based on the measured temperature of the detector 30 and/or surrounding environment.

In one embodiment, the photodetectors are solid state detectors, such as photodiodes. Each photodetector may include one or more diodes. For example, silicon photomultiplier clusters can serve as compact and very sensitive detectors whose small sizes are advantageous in applications for narrow boreholes. In another example, avalanche photodiodes or single photon avalanche photodiodes can be used with active rapid quenching fast discriminator circuitry to enable higher radiation counts and shorter dead times relative to conventional photodiodes. Such diodes can be sensitive enough to detect a single photon.

In one embodiment, the detector includes an axial array of individual photodetectors or photodetector devices (e.g., diode clusters) disposed along a selected length of the scintillator material 32. For example, as shown in FIG. 2, an array of detectors 36 are positioned along the longitudinal axis of the scintillator material 32, shown as the z-axis. Analysis of signals received by the detectors can provide information about where a flash of photons originated within the detector 30. The arrays may include individual photodetector devices that are individually attached to the scintillator or a transparent material (e.g., high index glass), or an array disposed on a single support structure, such as a single silicon wafer.

Additional arrays of detectors may be positioned at various locations around the scintillating material to allow for estimation of flash positions not only along the longitudinal axis (z-axis), put also along other axes. For example, as shown in FIG. 2, two arrays are shown that both extend longitudinally, but are positioned orthogonally relative to each other in a plane perpendicular to the longitudinal axis (the x-y plane). By analyzing pairs of photodetectors that are located in the same x-y plane, the position of a flash can be estimated in three dimensions. Adding more diode strips at various angles around detectors can provide information about the directions of movements of gamma rays or particles within detectors.

Figure 3:
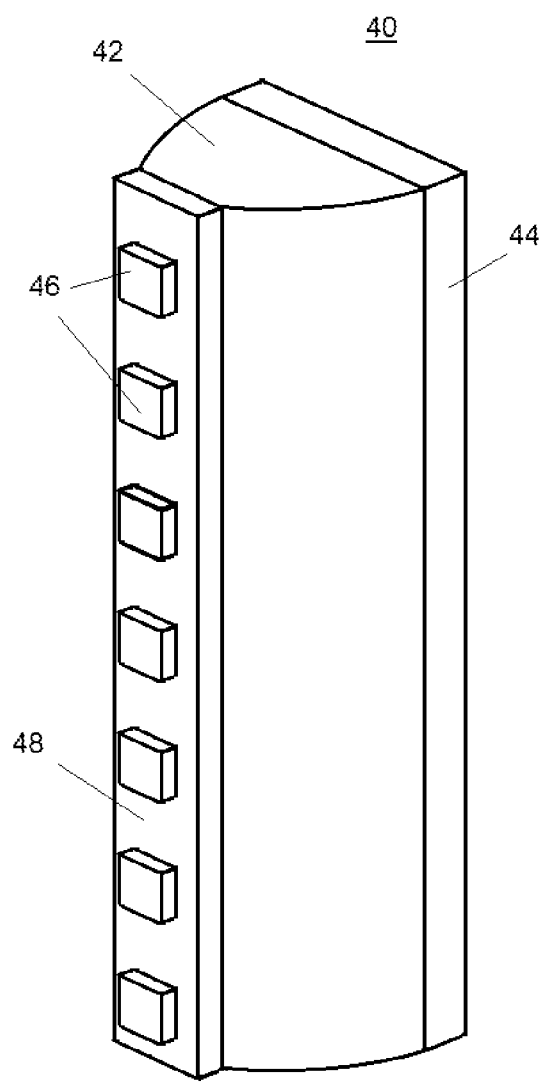
FIG. 3 depicts an embodiment of a scintillation detector including a scintillation material shaped to facilitate light flash detection.

Referring to FIG. 3, an exemplary scintillation detector 40 is shown that includes various features designed to facilitate gamma ray and/or neutron detection by, e.g., improving detection precision, light flash magnitude, and detection of directional characteristics of light flashes. One such feature is a scintillator material (e.g., Li6 glass) and/or a transparent material that is shaped to direct and/or focus light flashes toward one or more detectors.

The scintillation detector 40 includes a glass scintillation material 42 configured to emit electromagnetic radiation (referred to as light flashes) in response to neutrons and/or gamma rays entering the material. Exemplary scintillation materials include a Li6 glass scintillator for detection of neutrons, and a NaI(Tl) material for detection of gamma rays. The detector may optionally include a transparent entrance window 44 that does not substantially absorb radiation, such as a beryllium or mylar window.

The scintillation material 42 is parabolically shaped so as to direct light flashes in the material toward an array of detectors 46. In this example, the material forms a parabolic shape in a plane perpendicular to the direction of the detector array. Any suitable shape may be used to facilitate directing or focusing light flashes toward the detectors 46. Other exemplary shapes include conical shapes, elliptical shapes and lens shapes.

The detector 40 may also include a transmission material 48 that is transparent to at least the light flashes. The transmission material may be shaped similarly to the scintillator material, or have another shape designed to concentration, focus and/or direct light flashes toward one or more detectors. In one embodiment, the transmission material 48 is configured to detect neutrons and the scintillation material 42 is configured to detect gamma rays (or vice versa), thus providing a detector capable of detecting both neutrons and gamma rays. For example, the transmission material 48 is made from a Li6 or boron-10 enriched glass. In one embodiment, the transmission material is made from a glass or other transparent material that has a higher index of refraction than the scintillation material. This index difference can be used to bend light incident on the transmission material toward a detector, to increase the amount of light from a flash that is applied to the detector.

In one embodiment, the scintillation detector is shaped to increase the cross sectional area of the material toward a region or location of interest. For example, as shown in FIG. 3, the surface of the scintillation material 42 opposite the detectors 46 has a large surface area relative to other surfaces of the material. This relatively large surface can be directed toward locations of interest. For downhole logging applications, the detector may be deployed so that the large surface is directed toward the formation. Rotation of the detector about the detector's long axis allows for detection of selected regions of the formation surrounding the borehole. Other shapes may be used to achieve this larger surface, such as flattened or partially curved scintillators. This embodiment provides for higher cross-sectional areas in directions of interest (e.g., the directions of specific formations) and lower areas and cross sections in directions from which gamma rays or particles are not of interest.

To further facilitate light flash detection, a reflective material may be disposed on surfaces of the scintillation material, such as the parabolically shaped sides of the scintillation material. For example, a reflective coating such as a Teflon film is disposed on the surfaces. In addition, a protective shielding material that reflects or absorbs gamma rays and/or neutrons is disposed on surfaces (e.g., the parabolic surfaces) to prevent radiation from entering the scintillation material from areas other than the region of interest.

Figure 4:
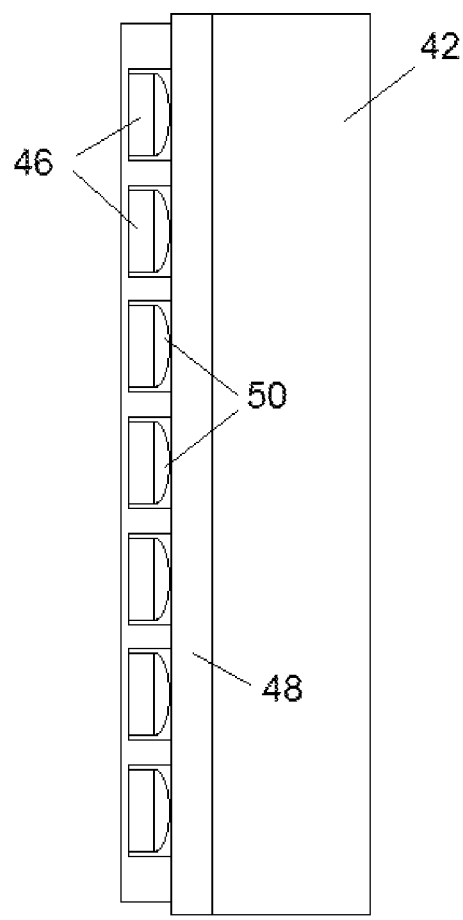
FIG. 4 depicts another embodiment of the scintillation detector of FIG. 3, which includes an array of lenses to direct and/or focus light flashes toward selected detectors.

Referring to FIG. 4, in one embodiment, relatively small lenses 50 made of glass, crystals, or other materials are located between the scintillation material 42 and/or the transmission material 48 and the photodetectors 46 for focusing and accumulating more light for specific diodes within the array. The lenses described herein are effective in saving tight spaces, concentrating photons, and/or detecting neutrons.

The lenses 50 may be shaped to direct light flashes from selected areas of the scintillation material toward selected detectors. For example, each detector has a lenses coupled thereto that is shaped to collect light flashes from a selected region of the scintillation material. The lens shapes may also match the light paths from the scintillation material to cover optimum amounts of the surfaces of each detector. As a result, dust or other small particle contaminants that might seriously diminish or disable a point source receiver would have far less of an impact upon reliability. Such lenses may be uniquely shaped and having a short focus to effectively concentrate or focus light flashes to respective detectors.

In one embodiment, the lenses themselves are made from a scintillation material that is different than the scintillation material 42. For example, a neutron detection material such as boron-10 enriched glass for lenses would not only serve to concentrate light flashes, but also serve as an efficient neutron detecting material close to the detectors 46. Using the volumes of the lenses to additionally detect neutrons saves very expensive space in narrow tools that can fit into boreholes. Also, borosilicate glass has smaller temperature size variations and stresses with changes in temperatures than other glasses, and thus is effective in boreholes, which can be quite hot with large variations in temperature. Opacity issues are reduced by this configuration due to the relatively small sizes of lenses compared to larger and darker crystals or other materials.

Other materials that can be used for the lenses include glass doped with gadolinium or other combinations of dopants with very high neutron capture cross sections.

As discussed above, the scintillation detectors described herein may be utilized in a method of estimating one or more properties of an earth formation. The method may be performed in conjunction with the system 10, the downhole tool 18 and/or the scintillation detectors described herein, but is not limited thereto.

In a first stage, the pulsed neutron tool 18 is disposed in the borehole 14, and one or more measurements are taken using a scintillation detector (or detectors). The borehole 14 may be a cased borehole or an open borehole. Measurements are taken by activating the neutron source 22 and detecting resultant gamma ray photons. In one embodiment, one or more measurements are taken for each of a plurality of borehole depths.

In one embodiment, the taking of measurements from the tool 18 is recorded in relation to the depth and/or position of the tool 18, which is referred to as "logging", and a record of such measurements is referred to as a "log". Examples of logging processes that can be performed by the system 10 and in conjunction with the methods described herein include measurement-while-drilling (MWD) and logging-while-drilling (LWD) processes. Additional examples of logging processes include logging measurements after drilling, wireline logging, pipe-conveyed logging operations, drop shot logging and memory logging. The data retrieved during these processes may be transmitted to the surface, and may also be stored with the downhole tool for later retrieval.

In a second stage, detected signals are processed or analyzed to reduce noise. By concurrently detecting flashes by multiple detectors, noise pulses common to each detector are identified and filtered or otherwise eliminated from the detected signals. In one embodiment, a library or other repository of signal shapes is accessed and compared to detected signals. The library may include records of signal shapes indicative of noise.

The shape library may be applied so that wavelets are extracted to derive pattern shape ranges for valid data and for systematic noise or other invalid pulse shapes. Components of detected signals indicative of noise are filtered or otherwise removed from the detected signal.

In a third stage, signals detected using the detectors are analyzed to estimate locations of flashes occurring in the scintillating material and/or orientations of gamma rays. In one embodiment, mathematical inversions of variations in detected light strengths among the diodes enables estimates of flash locations and corrections to opacity dimming.

For example, multiple axial detector arrays provide signal patterns due to detected light flashes. By examining the relative strengths of the signal for each detector, the location of a light flash in the scintillation material is estimated. Estimation of the light flashes over time allows for estimation of the path and orientation of gamma rays. The signal strength and orientation of the gamma rays provides an indication of the location in the formation from which the gamma rays were generated. In addition, first and second derivatives for rates of changes in pattern responses can be calculated and used to help in the determination of energy levels, orientations, and attributes of signals.

Specially constructed calibration pits containing sands and other minerals will allow measurements of attenuations and shape changes of flashes due to the different locations and distances of gamma ray origins within formations. Gamma rays traveling further toward boreholes often become weaker due to collisions. Such weaker gamma rays can be detected and analyzed as described herein. Conventional systems, in contrast, often eliminate the weakened signals with cutoff discriminator settings because of less advanced signal and noise processing capabilities.

The apparatuses and methods described herein have various advantages over prior art apparatuses and techniques. The precision and accuracy of signals measured using embodiments described herein provide superior accuracy and precision. Other advantages include improved detection of light flash directions and magnitudes to allow for more accurate measurement or logging spectrums. For example, embodiments allow for estimation of the location in a scintillator at which light flashes occur without having to rely on analysis of brightness, which can be less certain due to internal effects on brightness. Higher resolutions, fewer attenuated energy levels, and narrower spectral peaks contribute to more accurate sorting of photons and associated elements.

Deriving more accurate directions of gamma rays and particle movements can help in eliminating spurious counts less representative of geologic formations. In conventional systems, numerous unwanted counts are altered by borehole conditions, fluids, and extraneous travels often including paths through materials within logging tools. Improved interpretations of formation properties can come from detections and processing that avoids the use of so many counts and characteristics from problematic radiation.

Embodiments described herein also include various focusing elements or features that increase or maximize the amount of light reaching photodiodes or other detectors. As a result, dust or other small particle contaminants that might seriously diminish or disable a point source receiver would have far less of an impact upon reliability. Deriving more accurate directions of gamma rays and particle movements can help in eliminating spurious counts less representative of geologic formations. In conventional systems, numerous unwanted counts are altered by borehole conditions, fluids, and extraneous travels often including paths through materials within logging tools. Improved interpretations of formation properties can come from detections and processing that avoids the use of so many counts and characteristics from problematic radiation. Currently, conventional logging systems have inherently more problems with the unwanted and erroneous radiation.

In connection with the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user, or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

What is claimed is:

1. An apparatus for measuring properties of an earth formation, comprising:
   a carrier configured to be disposed in a borehole in an earth formation;

a scintillation material configured to emit light flashes in response to exposure to radiation, the scintillation material having a surface configured to be directed toward a region of the formation;
an array of solid-state photodetectors that extends along a first direction on at least one surface of the scintillation material, wherein the scintillation material has a shape configured to concentrate the light flashes that occur within the scintillation material and focus the light flashes within the scintillation material toward the array; and
a processor configured to detect signals generated by photodetectors in the array and estimate energy levels of the light flashes and locations of the light flashes within the scintillation material.

2. The apparatus of claim 1, wherein the scintillation material has a parabolic shape in a plane perpendicular to the first direction, the shape configured to focus the light flashes toward one or more photodetectors in the array.

3. The apparatus of claim 1, wherein the scintillation material is a first scintillation material configured to detect gamma rays and the array is a first array that extends along an axis of the scintillation material, the apparatus further comprising:
a second array that extends in a direction parallel to the axis, and is located orthogonal to the first array in a plane perpendicular to the axis, wherein the processor is configured to estimate three-dimensional locations of light flashes based on detection of the light flashes by at least a pair of photodetectors including a photodetector from the first array and a photodetector from the second array; and
a lens coupled to each photodetector in the first and second arrays, the lens made from a second scintillation material configured to detect neutrons near each photodetector.

4. The apparatus of claim 1, wherein the array is a first array that extends along an axis of the scintillation material, the apparatus further comprising a second array that extends in a direction parallel to the axis, and is located orthogonal to the first array in a plane perpendicular to the axis.

5. The apparatus of claim 4, wherein the processor is configured to estimate three-dimensional locations of light flashes within the scintillation material.

6. The apparatus of claim 4, wherein the processor is configured to estimate a direction and orientation of gamma rays based on the three-dimensional locations of light flashes.

7. The apparatus of claim 1, wherein the processor is configured to estimate three-dimensional locations of light flashes within the scintillation material.

8. The apparatus of claim 1, further comprising a lens coupled to each photodetector in the array.

9. The apparatus of claim 8, wherein the scintillation material is a first scintillation material configured to detect gamma rays, and the lens is made from a second scintillation material configured to detect neutrons.

10. The apparatus of claim 1, further comprising a transparent material disposed between the photodetectors and the scintillation material, the transparent material having an index of refraction that is greater than the index of refraction of the scintillation material.

11. A method of processing a scintillation detection signal, comprising:

deploying a carrier in a borehole in an earth formation, the carrier including a scintillation material configured to emit light flashes in response to exposure to radiation;
directing a surface of the scintillation material toward a region of the formation;
detecting the light flashes by an array of solid-state photodetectors that extends along a first direction on at least one surface of the scintillation material, wherein the scintillation material has a shape configured to concentrate the light flashes that occur within the scintillation material and focus the light flashes within the scintillation material toward the array; and
detecting, by a processor, signals generated by photodetectors in the array and estimating energy levels of the light flashes and locations of the light flashes within the scintillation material.

12. The method of claim 11, wherein the scintillation material has a parabolic shape in a plane perpendicular to the first direction, the shape configured to focus the light flashes toward one or more photodetectors in the array.

13. The method of claim 11, wherein the scintillation material is a first scintillation material configured to detect gamma rays and the array is a first array that extends along an axis of the scintillation material, and a lens is coupled to each photodetector in the first and second arrays, the lens made from a second scintillation material configured to detect neutrons near each photodetector, the method further comprising:
detecting light flashes by a second array of photodetectors that extends in a direction parallel to the axis, and is located orthogonal to the first array in a plane perpendicular to the axis; and
estimating three-dimensional locations of light flashes based on detection of the light flashes by at least a pair of photodetectors including a photodetector from the first array and a photodetector from the second array.

14. The method of claim 11, wherein the array is a first array that extends along an axis of the scintillation material, the method further comprising detecting light flashes by a second array that extends in a direction parallel to the axis, and is located orthogonal to the first array in a plane perpendicular to the axis.

15. The method of claim 14, wherein estimating the positions of the light flashes includes estimating three-dimensional locations of light flashes within the scintillation material.

16. The method of claim 14, further comprising estimating a direction and orientation of gamma rays based on the three-dimensional locations of light flashes.

17. The method of claim 11, wherein the processor is configured to estimate three-dimensional locations of light flashes within the scintillation material.

18. The method of claim 11, wherein the array includes a lens coupled to each photodetector in the array.

19. The method of claim 18, wherein the scintillation material is a first scintillation material configured to detect gamma rays, and the lens is made from a second scintillation material configured to detect neutrons.

20. The method of claim 11, wherein detecting the light flashes includes directing the light flashes toward photodetectors in the array by a transparent material disposed between the photodetectors and the scintillation material, the transparent material having an index of refraction that is greater than the index of refraction of the scintillation material.

* * * * *